United States Patent
Gou et al.

(10) Patent No.: US 8,634,965 B1
(45) Date of Patent: Jan. 21, 2014

(54) COMPUTER-BASED METHOD FOR POWER SYSTEM STATE ESTIMATION

(71) Applicants: Bei Gou, Mansfield, TX (US); Weibiao Wu, Chicago, IL (US)

(72) Inventors: Bei Gou, Mansfield, TX (US); Weibiao Wu, Chicago, IL (US)

( * ) Notice: Subject to any disclaimer, the term of this patent is extended or adjusted under 35 U.S.C. 154(b) by 0 days.

(21) Appl. No.: 13/680,300

(22) Filed: Nov. 19, 2012

Related U.S. Application Data

(63) Continuation-in-part of application No. 12/928,069, filed on Dec. 3, 2010, now abandoned.

(51) Int. Cl.
*G05D 29/00* (2006.01)

(52) U.S. Cl.
USPC ............ 700/286; 700/291; 700/292; 700/297

(58) Field of Classification Search
None
See application file for complete search history.

(56) References Cited

U.S. PATENT DOCUMENTS

| | | | |
|---|---|---|---|
| 5,918,200 | A | 6/1999 | Tsutsui |
| 6,694,270 | B2 | 2/2004 | Hart |
| 6,985,800 | B2 | 1/2006 | Rehtanz |
| 7,233,843 | B2 | 6/2007 | Budhraja |
| 7,499,816 | B2 | 3/2009 | Scholtz |
| 7,519,506 | B2 | 4/2009 | Trias |
| 7,979,239 | B2 | 7/2011 | Trias |
| 2008/0262758 | A1 | 10/2008 | Rehtanz |
| 2011/0270550 | A1 | 11/2011 | Kreiss |

OTHER PUBLICATIONS

K.S. Clements et al., "Multiple Bad Data Detectability and Identifiability: A Geometric Approach," IEEE Transactions on Power Delivery, vol. PWRD-1, No. 3, Jul. 1986, pp. 355-360.*
E. Handschin et al., "Bad Data Analysis for Power System State Estimation," Lecture Notes in Economics and Mathematical Systems: Control Theory, 4th IFAC/IFIP International Conference on Digital Computer Applications to Process Control, part II, Mar. 19-22, 1974, pp. 230-242.*
E. Handschin et al., "Bad Data Analysis for Power System State Estimation," IEEE Transactions on Power Apparatus and Systems, vol. PAS-94, No. 2, Mar./Apr. 1975, pp. 329-337.*

* cited by examiner

*Primary Examiner* — Kavita Padmanabhan
*Assistant Examiner* — Christopher E Everett
(74) *Attorney, Agent, or Firm* — Jason L. Gilbert

(57) ABSTRACT

A method of power system state estimation for accurately identifying topology errors, parameter errors and measurement value errors for power networks in real-time. The system divides measured data into a base set and a redundant set. The system status is calculated using the base set. A residual vector of the redundant set is computed based on the system status. A matrix is calculated utilizing these sets. A threshold is utilized to decide the abnormal residuals of the redundant set. Colinearity between the residual vector and columns in the matrix are used to decide if base set measurements corresponding to the columns in the matrix are potentially bad data. An iterative process replaces bad data in the base set with measurements in the redundant set having smaller residuals, terminating upon removal of bad data. Topology errors and parameter errors may then be identified using the bad data in the redundant set.

20 Claims, 3 Drawing Sheets

COMPUTER-BASED METHOD FOR POWER SYSTEM STATE ESTIMATION

CROSS REFERENCE TO RELATED APPLICATIONS

I hereby claim benefit under Title 35, United States Code, Section 120 of U.S. patent application Ser. No. 12/928,069 filed Dec. 3, 2010. This application is a continuation-in-part of the Ser. No. 12/928,069 application. The Ser. No. 12/928,069 application is currently pending. The Ser. No. 12/928,069 application is hereby incorporated by reference into this application.

STATEMENT REGARDING FEDERALLY SPONSORED RESEARCH OR DEVELOPMENT

Not applicable to this application.

BACKGROUND OF THE INVENTION

1. Field of the Invention

The present invention relates generally to methods for state estimation and more specifically it relates to a method of power system state estimation for effectively and accurately identifying topology errors, parameter errors and measurement value errors for power networks in real-time.

2. Description of the Related Art

Any discussion of the related art throughout the specification should in no way be considered as an admission that such related art is widely known or forms part of common general knowledge in the field.

The power industry is urgently looking for new state-of-the-art state estimators to improve the security and avoid the occurrence of blackouts. The problem with the current power systems state estimator/monitor has existed for about 50 years, and has caused a lack of monitoring of power systems and hence a number of problems in power system operations. The August blackout in 2003 is an example of this. It forced the industry to solve this challenging problem.

The August Blackout, which lasted for 30 hours and heavily impacted the US Northeast region, costs the American business economy about $10 billion dollars in losses. The Presidential task force concluded that, "The initial problem was a software program glitch". The monitoring computer running the standard state estimation procedures in Ohio "hung-up" and "froze" and the operators became blind to the issues in the transmission network but did not do anything in the precious period before the occurrence. However, that was only a reflection of the modern state of affairs in power grid vulnerabilities. According to Bob Galvin, the retired CEO of Motorola, roughly 500,000 Americans spent at least two hours without electricity in their homes and businesses. These outages cost our economy $150 billion a year, The exact number of these blackouts that are due to the faulty computer monitoring is unknown but many power grid control centers acknowledge regular daily or weekly computer "glitches".

State estimation is a critical and vital function for electrical power grid control at the center of operations. Since the conception and use of state estimation for power grid operational management during the 1970's, it has been assumed that the method always produces a reliable and accurate real-time power flow status and modeling representations we know to be true except under condition of normal power glow. Under condition of high stress of transmission systems have been shown to fail consistently. The inaccuracy and unavailability of state estimation have large negative influences on the market price calculation and security assessment, two very important functions in power system operations. The inherent flaw in the commonly used weighted least square (WLS) state estimation is the root reason of the inaccurate and unavailability of state estimation. Continuous efforts from researches and engineers have been made to attempt to solve this challenging problem of WLS for decades. The present invention provides a revolutionary state estimation approach which would replace the existing state monitors.

Because of the inherent problems with the related art, there is a need for a new and improved computer-based method of power system state estimation for effectively and accurately identifying topology errors, parameter errors and measurement value errors for power networks in real-time.

BRIEF SUMMARY OF THE INVENTION

The invention generally relates to a computer-based method of power system state estimation which divides measured data from remote terminal units into a base set and a redundant set. The system status is calculated using the base set and a residual vector of the redundant set is computed based on the system status. A matrix is calculated utilizing these sets and a threshold, which is theoretically derived using statistics theory, is utilized to decide the abnormal residuals of the redundant set. Bad data could be in either or both of the base set and/or redundant measurement set. An iterative process replaces suspicious bad data in the base set with measurements in the redundant set having smaller residuals, with an objective to contain all suspicious bad data in the redundant measurement set. The process is terminated when no suspicious bad data remains in the base set. Topology errors and parameter errors may then be identified using the bad data in the redundant set.

There has thus been outlined, rather broadly, some of the features of the invention in order that the detailed description thereof may be better understood, and in order that the present contribution to the art may be better appreciated. There are additional features of the invention that will be described hereinafter and that will form the subject matter of the claims appended hereto. In this respect, before explaining at least one embodiment of the invention in detail, it is to be understood that the invention is not limited in its application to the details of construction or to the arrangements of the components set forth in the following description or illustrated in the drawings. The invention is capable of other embodiments and of being practiced and carried out in various ways. Also, it is to be understood that the phraseology and terminology employed herein are for the purpose of the description and should not be regarded as limiting.

BRIEF DESCRIPTION OF THE DRAWINGS

Various other objects, features and attendant advantages of the present invention will become fully appreciated as the same becomes better understood when considered in conjunction with the accompanying drawings, in which like reference characters designate the same or similar parts throughout the several views, and wherein.

DETAILED DESCRIPTION OF THE INVENTION

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not intended to be limited to the embodiments shown, but is to be accorded the widest scope consistent with the principles and features disclosed herein.

The data structures and code described in this detailed description are typically stored on a computer readable storage medium, which may be any device or medium that can store code and/or data for use by a computer system. This includes, but is not limited to, magnetic and optical storage devices such as disk drives, magnetic tape, CDs (compact discs), DVDs (digital video discs), and computer instruction signals embodied in a transmission medium (with or without a carrier wave upon which the signals are modulated). For example, the transmission medium may include a communications network, such as the Internet.

A. Overview of Invention.

Figure 1:
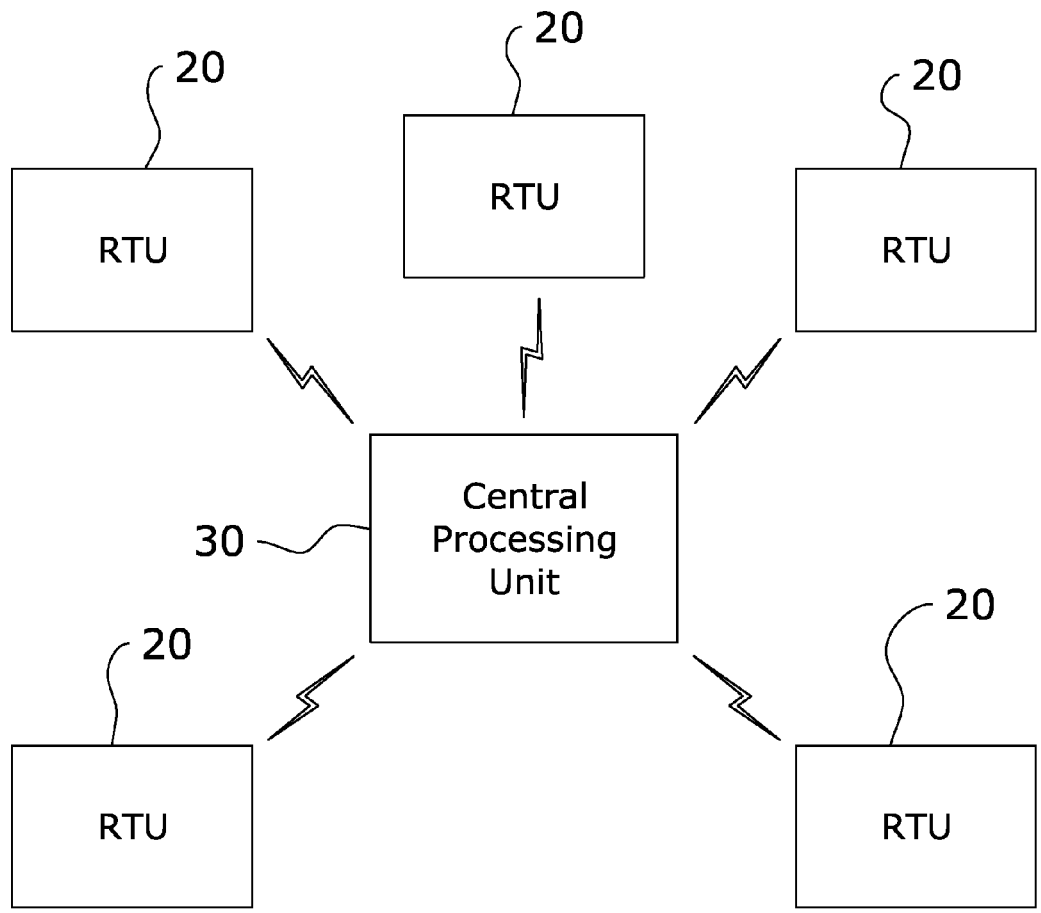
FIG. 1 is a block chart illustrating an exemplary embodiment of the present invention.
Figure 2:
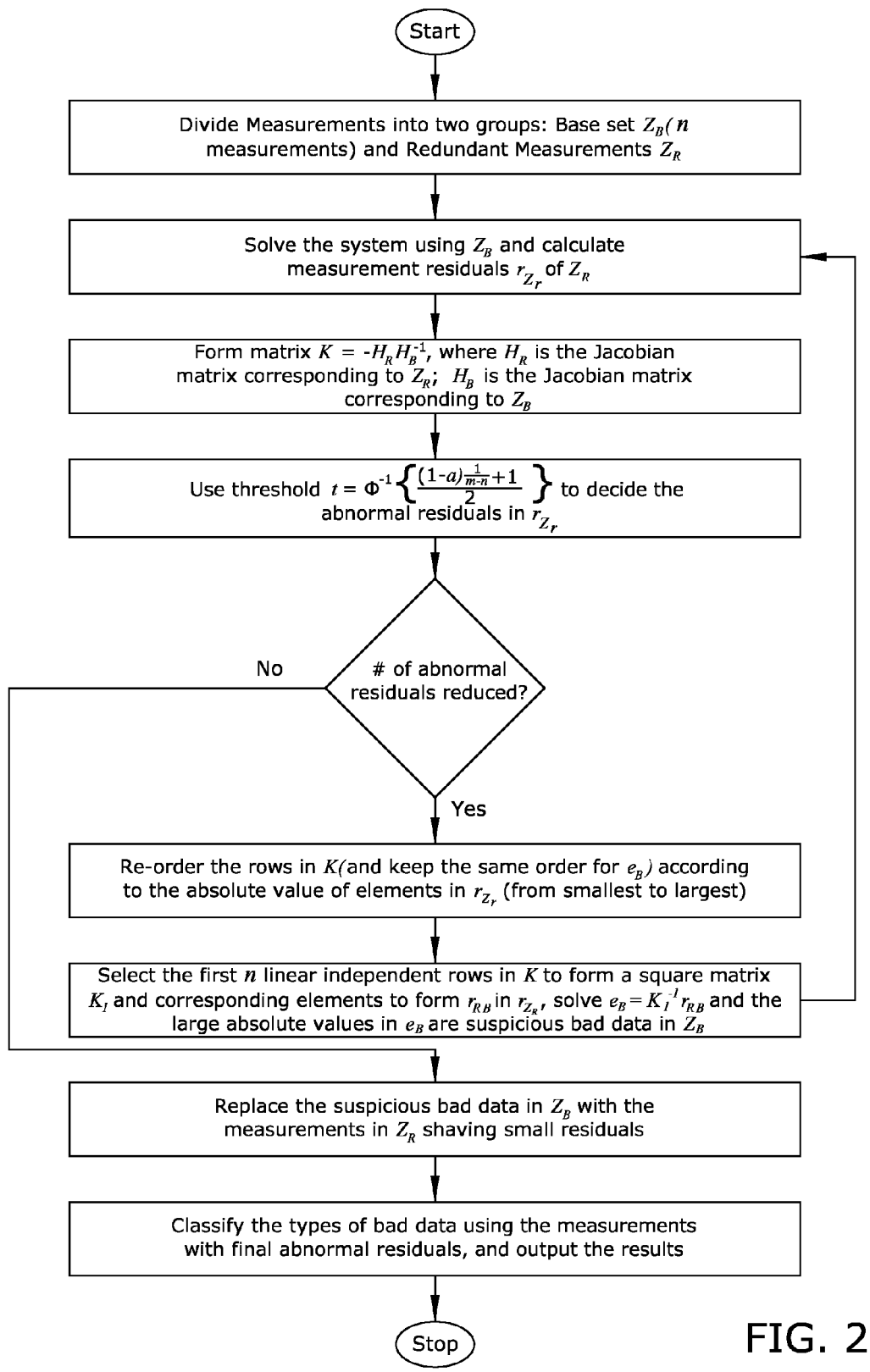
FIG. 2 is a flowchart illustrating the methods of the present invention.
Figure 3:
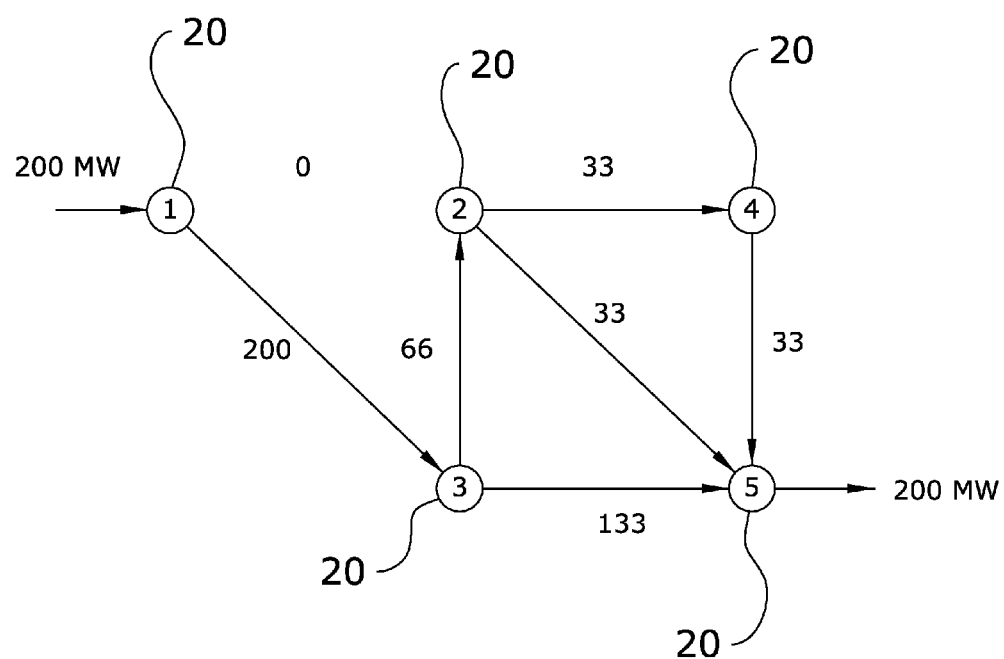
FIG. 3 is a circuit diagram illustrating an exemplary power distribution system which may be analyzed by the present invention.

FIGS. 1 through 3 illustrate the present invention. The computer-based method of power system state estimation is generally implemented in combination with a transmission line network as is commonly used throughout the world to distribute power. A plurality of remote monitoring units, commonly referred to as remote terminal units (RTU) in the industry, are generally distributed throughout the transmission line network to measure various data regarding the transmission network. Such data may include, without limitation, power flow (real flow and reactive power) measurements on branches and at selective buses, voltage magnitude measurements as selective buses and topology status of branches and breakers. Additional measurements, such as phasor management unit (PMU) measurements, current measurements, tap measurements and the like may also be formulated in the environment.

The remote terminal units will generally be communicatively interconnected with one or more central processing units. Data is transferred from the plurality of remote terminal units to the central processing unit, which performs the various functions and methods of the present invention as described herein. It is appreciated that the remote terminal units may be communicatively connected with the central processing unit by various methods, such as by use of a telecommunications network. In some embodiments, data measurements from the remote terminal units will be manually collected and transferred to the central processing unit, such as by sending field workers out to collect such data on a mobile computing device and subsequently transferring such data from the mobile computing device to the central processing unit.

B. Exemplary Telecommunications Networks.

The present invention may be utilized upon any telecommunication network capable of transmitting data including voice data and other types of electronic data. Examples of suitable telecommunication networks for the present invention include but are not limited to global computer networks (e.g. Internet), wireless networks, cellular networks, satellite communications networks, cable communication networks (via a cable modem), microwave communications network, local area networks (LAN), wide area networks (WAN), campus area networks (CAN), metropolitan-area networks (MAN), and home area networks (HAN). The present invention may communicate via a single telecommunication network or multiple telecommunication networks concurrently. Various protocols may be utilized by the electronic devices for communications such as but not limited to HTTP, SMTP, FTP and WAP (wireless Application Protocol). The present invention may be implemented upon various wireless networks such as but not limited to 3G, 4G, LTE, CDPD, CDMA, GSM, PDC, PHS, TDMA, FLEX, REFLEX, IDEN, TETRA, DECT, DATATAC, and MOBITEX. The present invention may also be utilized with online services and internet service providers.

The Internet is an exemplary communications network for the present invention. The Internet is basically comprised of a "global computer network." A plurality of computer systems around the world are in communication with one another via this global computer network and are able to transmit various types of data between one another. The communications between the computer systems may be accomplished via various methods such as but not limited to wireless, Ethernet, cable, direct connection, telephone lines, and satellite.

C. Central Processing Unit.

The central communication unit may be comprised of any central communication site where communications are preferably established with. The central communication units may be comprised of a server computer, cloud based computer, virtual computer, home computer or other computer system capable of receiving and transmitting data via IP networks and the telecommunication networks. As can be appreciated, a modem or other communication device may be required between each of the central communication units and the corresponding telecommunication networks. The central communication unit may be comprised of any electronic system capable of receiving and transmitting information (e.g. voice data, computer data, etc.).

The central processing unit 30 may be comprised of any conventional computer. A conventional computer preferably includes a display screen (or monitor), a printer, a hard disk drive, a network interface, and a keyboard. A conventional computer also includes a microprocessor, a memory bus, random access memory (RAM), read only memory (ROM), a peripheral bus, and a keyboard controller. The microprocessor is a general-purpose digital processor that controls the operation of the computer. The microprocessor can be a single-chip processor or implemented with multiple components. Using instructions retrieved from memory, the microprocessor controls the reception and manipulations of input data and the output and display of data on output devices. The memory bus is utilized by the microprocessor to access the RAM and the ROM. RAM is used by microprocessor as a general storage area and as scratch-pad memory, and can also be used to store input data and processed data. ROM can be used to store instructions or program code followed by microprocessor as well as other data. A peripheral bus is used to access the input, output and storage devices used by the computer. In the described embodiments, these devices include a display screen, a printer device, a hard disk drive, and a network interface. A keyboard controller is used to receive input from the keyboard and send decoded symbols for each pressed key to microprocessor over bus. The keyboard is used by a user to input commands and other instructions to the computer system. Other types of user input devices can also be used in conjunction with the present invention. For example, pointing devices such as a computer mouse, a track ball, a stylus, or a tablet to manipulate a pointer on a screen of the computer system. The display screen is an output device that displays images of data provided by the microprocessor via the peripheral bus or provided by other components in the computer. The printer device when operating as a printer provides an image on a sheet of paper or a similar surface. The hard disk drive can be utilized to store various types of data. The microprocessor together with an operating system operate to execute computer code and produce and use data. The computer code and data may reside on RAM, ROM, or hard disk drive. The computer code and data can also reside on a removable program medium and loaded or installed onto computer system when needed. Removable program mediums include, for example, CD-ROM, PC-CARD, USB drives, floppy disk and magnetic tape. The network interface circuit is utilized to send and receive data over a network connected to other computer systems. An interface card or similar device and appropriate software implemented by microprocessor can be utilized to connect the computer system to an existing network and transfer data according to standard protocols.

D. Mobile Devices.

The present invention may utilize mobile devices, such as the remote terminal units 20. It is appreciated that various types of remote terminal units 20 may be utilized as are known in the art, so long as the requisite data is capable of being monitored and stored therein for either transmission to the central processing unit or transfer to a mobile device. In embodiments in which data is manually collected from the remote terminal units 20, mobile devices may also include any computing device capable of downloading the data directly from the remote terminal unit 20 and transferring manually to the central processing unit.

The mobile device may be comprised of any type of computer for practicing the various aspects of the present invention. For example, the mobile device can be a personal computer (e.g. APPLE® based computer, an IBM based computer, or compatible thereof) or tablet computer (e.g. IPAD®). The mobile device may also be comprised of various other electronic devices capable of sending and receiving electronic data including but not limited to smartphones, mobile phones, telephones, personal digital assistants (PDAs), mobile electronic devices, handheld wireless devices, two-way radios, smart phones, communicators, video viewing units, television units, television receivers, cable television receivers, pagers, communication devices, and digital satellite receiver units.

The present invention can also be embodied as computer readable code on a computer readable medium. The computer readable medium is any data storage device that can store data which can be thereafter be read by a computer system. Examples of the computer readable medium include but are not limited to read-only memory, random-access memory, magnetic data storage devices such as diskettes, USB flash drives, and optical data storage devices such as CD-ROMs. The computer readable medium can also be distributed over a network coupled computer systems so that the computer readable code is stored and executed in a distributed fashion.

The present invention may be embodied within various languages and technologies such as but not limited to JAVA, JAVASCRIPT, JSCRIPT, WMLSCRIPT, ACTIVEX, CGI, scripts, plug-ins, BASIC, VISUAL BASIC, C, C++, COBOL, FORTRAN, ADA, HTML, DHTML, XML, SGML, WML, HDML, FLASH, SHOCKWAVE, GIF, JPEG, ADOBE ACROBAT, PDF, MICROSOFT WORD, and PASCAL. The present invention may be operated upon various operating systems such as but not limited to ANDROID, UNIX, MACINTOSH, LINUX, WINDOWS, PALMOS, EPOC, WINDOWS CE, FLEXOS, OS/9, and JAVAOS.

E. State Estimation Operations.

The overall operation of the present invention is illustrated in FIG. 2. First, measurements are taken by remote terminal units in the field. These measurements may include, without limitation, power flow (real flow and reactive power) measurements on branches and at selective buses, voltage magnitude measurements as selective buses and topology status of branches and breakers. Additional measurements, such as PMU measurements, current measurements, tap measurements and the like may also be collected in the field.

The collected measurements from the remote terminal units 20 are transferred either manually or through a communications network to the central processing unit 30, generally comprised of a computer at a central location which is communicatively interconnected with the plurality of remote terminal units 20. The central processing unit 30 will receive the measurements, including the status of branches and breakers, from the various remote terminal units prior to proceeding with the additional steps of the present invention.

After measurements are received by the central processing unit, the measurements will be divided into two sets using observability analysis. The observability analysis is a process through which the central processing unit 30 divides the recorded measurements into (1) a base set ($Z_B$) comprised of those measurements which span the same number of system states and thus are able to solve the system states and (2) a redundant set ($Z_R$) comprised of those measurements which remain after selecting the base set.

Generally, measurements received by the central processing unit 30 will include branch flow measurements and injection measurements. Branch measurements are initially utilized because they are not affected by topology errors.

The number of measurements selected to form the base set will be dependent on the number of buses and measurements being considered. The number of measurements selected for inclusion in the base set will need to be capable of placement in a full rank matrix for calculation of residuals. Preferably, the base set will be formed of measurements which can form a spanning tree and/or those measurements which can connect all the buses without forming a loop. After selection of the base set, the set is put into a full rank Jacobian matrix $H_B$, where each column of the matrix will correspond to a bus. The redundant set will be comprised of those remaining measurements which were not included in the base set.

The base set is now utilized to calculate the voltages at all the buses from their measurement equations. For branch measurements, real power ($P_{ij}$) and reactive power ($Q_{ij}$) will be calculated using the below equations:

$$P_{ij} = V_i^2(g_i + g_{ij}) - V_i V_j(g_{ij} \cos\theta_{ij} + b_{ij} \sin\theta_{ij})$$

$$Q_{ij} = -V_i^2(b_i + b_{ij}) - V_i V_j(g_{ij} \sin\theta_{ij} - b_{ij} \cos\theta_{ij})$$

For injection measurements, real power ($P_{ij}$) and reactive power ($Q_{ij}$) will be calculated using the below equations:

$$P_i = V_i \sum_{j \in N_i} V_j(G_{ij}\cos\theta_{ij} + B_{ij}\sin\theta_{ij})$$

$$Q_i = V_i \sum_{j \in N_i} V_j(G_{ij}\sin\theta_{ij} - B_{ij}\cos\theta_{ij})$$

With respect to the equations above, $V_i$, $\theta_i$ is the voltage magnitude and phase angle at bus i, $\theta_{ij} = \theta_i - \theta_j$; $G_{ij} + jB_{ij}$ is the ij th element of the complex bus admittance matrix; and $g_{ij} + jb_{ij}$ is the admittance of the series branch connecting buses i and j. $g_i+jb_i$ is the admittance of the shunt branch connected at bus i. $N_i$ is the set of bus numbers that are directly connected to bus i.

After obtaining voltage values, the above measurement equations may be utilized to calculate the recovered values of the remaining measurements in the redundant set. The residuals of the redundant set are calculated as the difference between the calculated values for the redundant set and the measured values for the redundant set. These values will be placed into a column vector $r_{Z_R}$.

After calculation of the bus voltages and residuals, a matrix is formed using the calculation:

$$K = -H_R H_B^{-1},$$

wherein $H_B$ is the Jacobian matrix corresponding to $Z_B$ and $H_R$ is the Jacobian matrix corresponding to $Z_R$.

Now, averaged calculations will be calculated using the below equation to create a vector C comprised of the individual results of the averaged calculation below:

$$c_i = \sqrt{\sum_{j=1}^{n} k_{ij}^2 \sigma_j^2}$$

In this equation, $k_{ij}$ is the entry in i-th row and j-th column in matrix K and $\sigma_j = \sigma = 0.01$ is given.

After forming the matrix K and vector C, an algorithm is run to decide abnormal residuals in $r_{Z_r}$. A threshold is calculated as shown below, where t is the threshold, a is the confidence level and $\Phi$ is the normal distribution:

$$t = \Phi^{-1}\left\{\frac{(1-\alpha)^{\frac{1}{m-n}} + 1}{2}\right\}.$$

In this equation, $\alpha$ represents a confidence level, m is the total number of measurements across the system; n is the number of measurements in $Z_B$ and $\Phi^{-1}$ is the inverse function of the standard normal distribution function. This threshold is utilized to determine whether the residuals represent possibly bad data.

After the threshold is calculated, the residuals of the redundant set will be divided by the corresponding averaged calculation from vector C as shown below to determine any potential bad measurements:

$$\left|\frac{Y_i}{c_i}\right| > t$$

In this equation, $Y_i$ is the corresponding element in $r_{Z_R}$ and $c_i$ is the corresponding element from the averaged calculations vector C. Any residuals exhibiting a value greater than the threshold are considered to be possibly bad data.

If abnormal residuals are not detected, then the data can be considered accurate. If abnormal residuals are detected, a looping algorithm is performed to identify suspicious bad data and remove it from the measurements. This looping algorithm is repeated until no residuals are calculated as being over the threshold when divided by the corresponding averaged calculation.

Upon detection of suspiciously bad data, the system will attempt to identify the bad data and replace it with proper measurements. The equation $r_{Z_R}^{re-ordered} = K^{re-ordered} e_B$ is solved by first re-ordering the rows in K according to the absolute value of elements in $r_{Z_R}$ smallest to largest, while retaining the same order for $e_B$. Next, the first n linear-independent rows in K are selected to form a square matrix $K^{re-ordered}$. Similarly, the first n rows in $r_{Z_R}$ are selected to form a column vector $r_{Z_R}^{re-ordered}$. Now, the equation $e_B = r_{Z_R}^{re-ordered}/K^{re-ordered}$ may be solved. The large absolute values in $e_B$ may be considered suspicious bad data in $Z_B$. This suspicious bad data needs to be replaced with the measurements in the redundant set and the data re-analyzed to locate any remaining bad data points.

In some circumstances, it is possible at a time that less than n rows in K are found linear-independent, and then the equation $r_{Z_R}^{re-ordered} = K^{re-ordered} e_B$ reduces to a smaller size matrix equation. Thus, elements (corresponding to measurements) in $e_B$ corresponding to the columns not appearing in the reduced $K^{re-ordered}$ cannot be estimated. In this case, those elements in $e_B$ that cannot be estimated imply critical or critical pair measurements. According to the estimation theory, bad data on critical or critical pair measurements cannot be detected and additional measurements need to be placed to convert those critical or critical pair measurements into redundant measurements.

F. Exemplary Calculation.

FIG. 3 illustrates an exemplary system to provide an example of the methods utilized by the present invention for state estimation. As shown in FIG. 3, the network includes five nodes and ten measurements; six branch flow measurements (P25, P35, P45, P13, P23, P24) and four injection measurements (P1, P2, P3 and P4). For this example, we will consider line 1-2 as out of service due to a topology error (i.e. the state estimator treats line 1-2 as in service due to a communication problem which does not send the correct status of this line to the central processing unit).

First, the base set is calculated using the equations described in the previous section. Branch flow measurements are used to start the selection of the base set because branch flow measurements are not affected by topology errors. Because measurements are selected to form the base set instead of solving the system, simplified data may be used for the measurements (i.e., $g_i + jb_i = 0$, $g_{ij} + jb_{ij} = 0$ and $G_{ij} + jB_{ij} = 0 + j(-1)$).

The system will attempt to find four measurements whose Jacobian matrix is full rank. In this example, 5−1=4 branch flow measurements which can form a spanning tree, will form the base set. For example, branch flow measurements P13, P35, P45 and P24 which can connect all of the buses in FIG. 3 without forming a loop forms a possible base set. Their Jacobian matrix may be written as shown below:

$$H_B = \begin{bmatrix} 1 & 0 & -1 & 0 & 0 \\ 0 & 0 & 1 & 0 & -1 \\ 0 & 0 & 0 & 1 & -1 \\ 0 & 1 & 0 & -1 & 0 \end{bmatrix} \begin{matrix} P13 \\ P35 \\ P45 \\ P24 \end{matrix}$$

Bus#  1  2  3  4  5

In this matrix, each column corresponds to a bus. Column 5, which corresponds to reference bus 5, may be removed to make the matrix full rank. However, in order to illustrate detection of topology errors, a base set may be formed which contains measurements P25, P35, P45 and P1, with the remaining measurements forming the redundant set.

With the base set selected, the power of each will be calculated with the equations previously listed as shown below:

$$P_{25} = V_2^2(g_2+g_{25}) - V_2V_5(g_{25}\cos\theta_{25} + b_{25}\sin\theta_{25})$$

$$P_{35} = V_3^2(g_3+g_{35}) - V_3V_5(g_{35}\cos\theta_{35} + b_{35}\sin\theta_{35})$$

$$P_{45} = V_4^2(g_4+g_{45}) - V_4V_5(g_{45}\cos\theta_{45} + b_{45}\sin\theta_{45})$$

$$P_1 = V_1V_2(G_{12}\cos\theta_{12} + B_{12}\sin\theta_{12}) + V_1V_3(G_{13}\cos\theta_{13} + B_{13}\sin\theta_{13})$$

where $V_1, V_2, V_3, V_4, V_5$ and $\theta_{12}, \theta_{13}, \theta_{25}, \theta_{35}, \theta_{45}$ are our variables needed to solve. Others are given parameters. The Newton-Raphison method may be used to solve the above equations. However, for the extreme case mentioned above ($Z_B$ is formed by branch flow measurements), we can calculate the bus voltage starting from the reference bus 5 following the each branch flow measurement (following the tree).

After obtaining the voltage values as described above, the present invention uses the measurement equations to calculate the recovered values of the remaining measurements in the redundant set. The residuals of the redundant set are calculated as the difference between the calculated values and the measured values. For example, $r_{P13} = P_{13}^{calculated} - P_{13}^{measured} = 1.335$. So for all the measurements in $Z_R$, we obtain a column vector $r_{Z_R}$ shown as follows:

$$r_{Z_R} = \begin{bmatrix} 1.335 \\ 0.0 \\ 0.0 \\ 1.345 \\ -1.335 \\ 0.0 \end{bmatrix} \begin{matrix} P13 \\ P23 \\ P24 \\ P2 \\ P3 \\ P4 \end{matrix}$$

The Jacobian matrices of the base and redundant sets are utilized to form a matrix K:

$$K = -H_R H_B^{-1} = \begin{bmatrix} 1 & -0.5 & 0 & 0.5 \\ 2 & -1 & 0 & 0 \\ 2 & 0 & -1 & 0 \\ 6 & -1.5 & -1 & -0.5 \\ -3 & .5 & 0 & -0.5 \\ -2 & 0 & 2 & 0 \end{bmatrix} \begin{matrix} P13 \\ P23 \\ P24 \\ P2 \\ P3 \\ P4 \end{matrix}$$

The rows in $r_{Z_R}$ and K correspond to each other. The rows in $r_{Z_R}$ may be re-ordered such that small residuals (absolute value) are ordered first:

$$r_{Z_R} = \begin{bmatrix} 0.0 \\ 0.0 \\ 0.0 \\ 1.335 \\ -1.335 \\ 1.345 \end{bmatrix} \begin{matrix} P23 \\ P24 \\ P4 \\ P13 \\ P3 \\ P2 \end{matrix}$$

Similarly, Matrix K may also be re-ordered accordingly:

$$K = \begin{bmatrix} 2 & -1 & 0 & 0 \\ 2 & 0 & -1 & 0 \\ 6 & -1.5 & -1 & -0.5 \\ -3 & .5 & 0 & -0.5 \\ -2 & 0 & 2 & 0 \\ 1 & -0.5 & 0 & 0.5 \end{bmatrix} \begin{matrix} P23 \\ P24 \\ P4 \\ P13 \\ P3 \\ P2 \end{matrix}$$

The averaged calculations C may be calculated using the methods described previously to find that $$C = \begin{bmatrix} C_1 \\ C_2 \\ C_3 \\ C_4 \\ C_5 \\ C_6 \end{bmatrix} = \begin{bmatrix} 0.12247 \\ 0.22361 \\ 0.22361 \\ 0.62849 \\ 0.30822 \\ 0.28284 \end{bmatrix}.$$

The threshold may now be calculated according to the below equation:

$$t = \Phi^{-1}\left\{\frac{(1-\alpha)^{\frac{1}{m-n}}+1}{2}\right\}$$

We set the confidence level $\alpha = 0.001$. $m=10$ is the total number of measurements across the system; $n=4$ is the number of measurements in $Z_B$; $\Phi^{-1}$ is the inverse function of standard normal distribution function. The above expression gives us $t=3.77$.

The below equation is then used to determine any possibly bad data:

$$\left|\frac{Y_i}{c_i}\right| > t$$

where $Y_i$ is the element in $r_{Z_R}$; $t=3.77$ is obtained at the beginning. Thus, we find P13, P2 and P3 have abnormal residuals in the present case.

Using the first four elements in $r_{Z_R}$ and the first four rows in K (both being reordered), the system may estimate the measurement errors of the base set using the equation $r_{Z_R}^{re\text{-}ordered} = K^{re\text{-}ordered} e_B$:

$$e_{Z_B} = \begin{bmatrix} e_{P25} \\ e_{P35} \\ e_{P45} \\ e_{P1} \end{bmatrix} = \begin{bmatrix} 0.0 \\ 0.0 \\ 0.0 \\ -2.69 \end{bmatrix}$$

The above result shows that injection measurement P1 is possibly bad data (the topology error on line 1-2 causes P1 to have a big residual which is considered suspicious bad data). The system then finds a measurement in the redundant set with small residual to replace P1 in the base set.

In this case, measurements in P13, P2 and P3 in the base set may replace P1 because others cannot make the Jacobian matrix ($H_B$) full rank. Either P3 or P13 may be selected because they have the same absolute values of residuals (1.335). Since the topology error on line 1-2 does not affect the measurement of equations of P3 or P13, the above process may be repeated and the new base set will be error-free, with all bad data moved to the redundant set.

For this example, P13 is selected to replace P1 in the base set. The new $r_{Z_R}$ shows that only P1 and P2 have large residuals:

$$r_{Z_R} = \begin{bmatrix} 0.0 \\ 0.0 \\ 0.0 \\ -3.9 \\ 0.0 \\ 3.9 \end{bmatrix} \begin{matrix} P23 \\ P24 \\ P4 \\ P2 \\ P3 \\ P1 \end{matrix}$$

Re-ordering the redundant set and Matrix K, the first four rows in K may be selected such that it has a full rank, the corresponding elements in $r_{Z_R}$ are all 0.0. Solving for the errors of measurements in the base set produces:

$$e_{Z_B} = \begin{bmatrix} e_{P25} \\ e_{P35} \\ e_{P45} \\ e_{P13} \end{bmatrix} = \begin{bmatrix} 0.0 \\ 0.0 \\ 0.0 \\ 0.0 \end{bmatrix}$$

which shows that all measurements in the base set are error-free and suspicious bad data P1 and P2 have been moved to the redundant set. This data is considered as bad data due to the topology error on line 1-2.

G. Classifying Error Types.

After identifying bad data (abnormal measurements) in a system as described previously, the present invention needs to be utilized to determine the cause of bad data. Injection measurements identified as problematic could be caused because of bad data measurements themselves or due to topology errors and/or parameter errors in the associate line. Thus, it is preferable to classify the type of error within the bad injection measurement(s) to find out the root bad data.

First, a bad injection measurement is selected at bus i such as, for example, $S_i^m$. If a line from bus i to bus j is identified as out of service, then the system will attempt to determine if the abnormal injection measurement is caused by line i to j. First, it is assumed that $S_i^m$ is error-free and the line from bus i to bus j is in-service. Thus, the system will calculate the power flow from line i to j:

$$S_{ij} = S_i^m - \sum_{k \in N, j \notin N} S_{ik}^r$$

where set N contains all of the buses connecting to bus i, excluding bus j. $S_{ik}^r$ is the branch power flow on the line from bus i to bus k, calculated using the obtained bus voltages from the system.

After calculating $S_{ij}$ and $V_i^r$, the present invention will calculate $V_j$ using the following equation:

$$V_j = Z_{ij} V_i^r \left[ \frac{1}{Z_{ij}} - \frac{S_{ij}^*}{|V_i^r|^2} + jy_{ij} \right].$$

Next, the present invention will compare $V_j$ and $V_j^r$ using the following parameters:

$$|V_j - V_j^r| < 1 - \Phi^{-1}\left(\frac{|V_j - V_j^r|}{\sigma_j}\right),$$

where $\Phi^{-1}$ is the inverse function of standard normal distribution and $\sigma_j$ is the standard deviation of measurement $V_j$. If the above equation is true, then the present invention will conclude that the line from bus i to bus j is actually in service.

If the previous equation is found to be false, then it is possible that the bad measurement $S_i^m$ is caused by in-service lines. Thus, each of the lines connecting to bus i is tested one-by-one. Initially, the line from bus i to bus k will be selected.

If at least one of the measurements ($S_{ik}^m$, $S_{ki}^m$, and $S_k^m$) related to the line from bus i to bus k is error-free, then the system will conclude that the bad injection measurement $S_i^m$ is not caused by line i to k and thus that line exhibits no problems.

If none of the measurements are error-free, the below equation will be utilized to calculate the line flow on line i to k:

$$S_{ik} = S_i^m - \sum_{j,k \notin N_1} S_{ij}^r$$

Where $N_1$ is a set containing all of the buses connecting to bus i except bus k. If $|S_{ik}| \approx 0$, then the present invention can conclude that line i to k has a topology error and is actually out-of-service. If $|S_{ik}| \neq 0$, the system will proceed with the following steps.

If none of $S_{ik}^m$, $S_{ki}^m$, and $S_k^m$ is available, then the system does not have enough measurements to decide if line i to k has a topology error or not. Thus, the system will have to analyze the next line. If at least one of the measurements $S_{ik}^m$, $S_{ki}^m$, and $S_k^m$ is available, then the following equation is calculated by the system:

$$Z_{ik} = \frac{V_i^{r*}}{S_{ik}^{'*}}(V_i^r - V_k^r)$$

where $S_{ik}' = S_{ik} + jy|V_i^r|^2$.

The system will then check that the calculated $Z_{ik}$ as determined above is correct or erroneous by using the available measurements $S_{ik}^m$, $S_{ki}^m$, and $S_k^m$. Specifically, to check $Z_{ik}$, the system will use the calculated $Z_{ik}$ and the terminal voltages $V_i^r$ and $V_k^r$ to recover those measurements ($S_{ik}^m$, $S_{ki}^m$, and $S_k^m$). If they match, then it can be concluded that line i to k has a parameter error. The correct parameter is thus $Z_{ik}$ as calculated above. If they do not match, then it can be concluded that line i to k exhibits no errors, and these functions may be repeated with the additional lines of the system.

In situations where previous steps have failed to detect a topology error on a line which causes big residuals for an injection measurement ($P_{inj}$ or $Q_{inj}$) on both connecting buses, additional steps must be formed to detect the topology error. For two neighboring buses A and B (connected by a line which may be either in-service or out-of-service), if only a single injection measurement at each of these two buses has big residuals, the following processes will be utilized to determine topology errors.

If the line between A and B is in-service, the system will assume it is out of service and re-calculate the recovered injection power flows at both buses. For example, if bus A has three buses connected ($I_1$, $I_2$ and $I_3$), and bus B has two buses connected ($J_1$ and $J_2$), then the recovered injection power flow at bus A will be calculated:

$$P_A^{rec} = P_A^{rec\text{-}original} - P_{A,B}$$

$$Q_A^{rec} = Q_A^{rec\text{-}original} - Q_{A,B}$$

where the real power and reactive power on the right hands of the above equation already exist, and $P_A^{rec\text{-}original}$ and $Q_A^{rec\text{-}original}$ are the recovered injection real power and reactive power at bus A prior to this calculation.

Similarly, the recovered injection power flow for bus B will be calculated as follows:

$$P_B^{rec} = P_B^{rec\text{-}original} - P_{B,A}$$

$$Q_B^{rec} = Q_B^{rec\text{-}original} - Q_{B,A}.$$

After calculation of the recovered injection power flows, each will be compared with the corresponding injection measurements at the respective buses to calculate the residuals. If the number of large residuals reduces as a result, the system will conclude that the line A to B is out-of-service due to a topology error.

If the line between A and B is out-of-service, then the system will assume they are in-service and re-calculate the recovered injection power flows at buses A and B. To calculate the recovered injection power flow at the buses, the branch power flow on line AB must be calculated as it is now assumed by the system to be in service.

Using previously calculated voltages $V_A$ and $V_B$, $P_{AB}^{rec}$ and $Q_{AB}^{rec}$ may be calculated by using the following equation:

$$S_{AB}^{rec} = P_{AB}^{rec} + jQ_{AB}^{rec} = V_A I_{AB}^* = V_A \left( jyV_A + \frac{V_A - V_B}{Z_{AB}} \right)^*$$

$$S_{BA}^{rec} = P_{BA}^{rec} + jQ_{BA}^{rec} = V_B I_{BA}^* = V_B \left( jyV_B + \frac{V_B - V_A}{Z_{AB}} \right)^*$$

Thus, the recovered injection power flow at buses A and B may be calculated using the following equations:

$$P_A^{rec} = P_A^{rec\text{-}original} + P_{AB}^{rec}$$

$$Q_A^{rec} = Q_A^{rec\text{-}original} + Q_{AB}^{rec}$$

$$P_B^{rec} = P_B^{rec\text{-}original} + P_{BA}^{rec}$$

$$Q_B^{rec} = Q_B^{rec\text{-}original} + Q_{BA}^{rec}$$

By comparing the obtained recovered injection power flows, the residuals may be calculated. If the number of large residuals reduces, then line A to B is considered out of service due to a topology error.

Unless otherwise defined, all technical and scientific terms used herein have the same meaning as commonly understood by one of ordinary skill in the art to which this invention belongs. Although methods and materials similar to or equivalent to those described herein can be used in the practice or testing of the present invention, suitable methods and materials are described above. All publications, patent applications, patents, and other references mentioned herein are incorporated by reference in their entirety to the extent allowed by applicable law and regulations. In case of conflict, the present specification, including definitions, will control. The present invention may be embodied in other specific forms without departing from the spirit or essential attributes thereof, and it is therefore desired that the present embodiment be considered in all respects as illustrative and not restrictive. Any headings utilized within the description are for convenience only and have no legal or limiting effect.

The invention claimed is:

1. A computer-implemented method for power system state estimation comprising:

receiving measurements of a power system by one or more remote terminal units;

transferring said measurements to a central processing unit;

dividing said measurements into a base set and a redundant set by said central processing unit;

calculating a voltage for each bus of said power system utilizing said base set by said central processing unit;

calculating a recovered value for each of said measurements in said redundant set by said central processing unit;

calculating a residual value for each of said measurements in said redundant set by calculating a difference between said recovered values and said measurements in said redundant set;

forming a vector $r_{Z_R}$ with said residual values by said central processing unit;

forming a matrix $K = -H_R H_B^{-1}$ by said central processing unit, wherein $H_B$ is a Jacobian matrix corresponding to said measurements of said base set and $H_R$ is a Jacobian matrix corresponding to said measurements of said redundant set by said central processing unit;

calculating averaged calculations to create a vector C by said central processing unit, wherein each value $c_i$ of said vector C is calculated using the equation $$c_i = \sqrt{\sum_{j=1}^{n} k_{ij}^2 \sigma_j^2},$$

wherein $k_{ij}$ is the entry in the i-th row and the j-th column in said matrix K;

calculating a threshold $$t = \Phi^{-1}\left\{ \frac{(1-\alpha)^{\frac{1}{m-n}} + 1}{2} \right\}$$

to determine abnormal residuals in said residual values, wherein $\alpha$ is comprised of a confidence level, m is a total number of measurements across said system; n is the number of said measurements in said base set and $\Phi^{-1}$ is the inverse function of the standard normal distribution function;

dividing each of said residual values by a corresponding value in said vector C by said central processing unit to create a comparative value;

comparing said comparative value for each of said measurements in said redundant said with said threshold;

determining each of said measurements in said base set is bad data if an absolute value of said comparative value is greater than said threshold by said central processing unit; and determining each of said measurements in said base set is good data if an absolute value of said comparative value is less than said threshold by said central processing unit.

2. The computer-implemented method for power system state estimation of claim 1, further comprising the steps of solving the equation $e_B = r_{Z_R}^{re\text{-}ordered}/K^{re\text{-}ordered}$ by said central processing unit, wherein $r_{Z_R}^{re\text{-}ordered}$ is comprised of said vector $r_{Z_R}$ with elements re-ordered from smallest to largest absolute value and wherein $K^{re\text{-}ordered}$ is comprised of said rows in matrix K re-ordered from smallest to largest absolute value.

3. The computer-implemented method for power system state estimation of claim 2, further comprising the step of determining each of said measurements in said base set is bad data if $e_B$ is calculated to have an absolute value greater than $$\Phi^{-1}\left(\frac{0.95}{\sigma_{e_{B_i}}}\right),$$

where $\Phi$ is the distribution function of standard Gauss distribution and $\sigma_{B}$, $$\sigma_{e_{B_i}}$$

is the standard deviation of the i-th element in $e_B$.

4. The computer-implemented method for power system state estimation of claim 3, further comprising the step of replacing said measurements in said base set determined by said central processing unit to be comprised of bad data with one of said measurements with a smallest residual value in said redundant set.

5. The computer-implemented method for power system state estimation of claim 1, further comprising the step of classifying said bad data, said step of classifying said bad data being comprised of solving the equation $$S_{ij} = S_i^m - \sum_{k \in N, j \notin N} S_{ik}^r$$

by said central processing unit, wherein $S_{ij}$ is comprised of a power flow value from bus i to bus j of said power system, wherein $S_i^m$ is comprised of an injection measurement of bus i, wherein set N is comprised of all of the buses connected to said bus i excluding said bus j and wherein $S_{ik}^r$ is comprised of a branch power flow value on a line from said bus i to a bus k.

6. The computer-implemented method for power system state estimation of claim 5, further comprising the step of calculating a voltage at bus j using the equation $$V_j = Z_{ij} V_i^r \left[\frac{1}{Z_{ij}} - \frac{S_{ij}^*}{|V_i^r|^2} + jy_{ij}\right],$$

wherein $Z_{ij}$ is a line impedance between said bus i and said bus j, wherein $V_i^r$ is comprised of a calculated voltage at bus i and $y_{ij}$ is comprised of a line shunt parameter.

7. The computer-implemented method for power system state estimation of claim 6, further comprising the step of determining said voltage at bus j is good data by said central processing unit if $$|V_j - V_j^r| < 1 - \Phi^{-1}\left(\frac{|V_j - V_j^r|}{\sigma_j}\right)$$

is calculated as true.

8. The computer-implemented method for power system state estimation of claim 7, further comprising the step of determining said voltage at bus j is bad data by said central processing unit if $$|V_j - V_j^r| < 1 - \Phi^{-1}\left(\frac{|V_j - V_j^r|}{\sigma_j}\right)$$

is calculated as false.

9. The computer-implemented method for power system state estimation of claim 8, further comprising the step of analyzing a line from bus i to bus k, comprising the steps of calculating the equation $$Z_{ik} = \frac{V_i^{r*}}{S_{ik}^{'*}}(V_i^r - V_k^r)$$

by said central processing unit, wherein $S_{ik}' = S_{ik} + jy|V_i^r|^2$ and utilizing said value $Z_{ik}$ if a parameter error is present.

10. The computer-implemented method for power system state estimation of claim 1, further comprising the step of recalculating a recovered injection power flow for a bus A and a bus B.

11. The computer-implemented method for power system state estimation of claim 10, wherein said step of recalculating a recovered injection power flow for said bus A is comprised of calculating a real power value using the equation $P_A^{rec} = P_A^{rec\text{-}original} - P_{A,B}$ and calculating a reactive power value using the equation $Q_A^{rec} = Q_A^{rec\text{-}original} - Q_{A,B}$.

12. The computer-implemented method for power system state estimation of claim 11, wherein said step of recalculating a recovered injection power flow for said bus B is comprised of calculating a real power value using the equation $P_B^{rec} = P_B^{rec\text{-}original} - P_{B,A}$ and calculating a reactive power value using the equation $Q_B^{rec} = Q_B^{rec\text{-}original} - Q_{B,A}$.

13. The computer-implemented method for power system state estimation of claim 12, further comprising the step of comparing said recovered injection power flows with said measurements at bus A and bus B and calculating residuals, wherein said central processing unit concludes the line from said bus A to said bus B is out of service due to topology error if a number of said calculated residuals has been reduced.

14. The computer-implemented method for power system state estimation of claim 10, further comprising the steps of recalculating a recovered injection power for buses A and B if a line from bus A to bus B appears to be in service but has a breaker status indicating said line is out of service, wherein said step of recalculating a recovered injection power flow for said bus A is comprised of calculating a real power value using the equation $P_A^{rec} = P_A^{rec\text{-}original} + P_{AB}^{rec}$ and calculating a reactive power value using the equation $Q_A^{rec} = Q_A^{rec\text{-}original} + Q_{AB}^{rec}$.

15. The computer-implemented method for power system state estimation of claim 14, wherein said step of recalculating a recovered injection power flow for said bus B is comprised of calculating a real power value using the equation $P_B^{rec} = P_B^{rec\text{-}original} + P_{BA}^{rec}$ and calculating a reactive power value using the equation $Q_B^{rec} = Q_B^{rec\text{-}original} + Q_{BA}^{rec}$.

16. The computer-implemented method for power system state estimation of claim 15, further comprising the step of calculating residuals for said recovered injection power flows.

17. The computer-implemented method for power system state estimation of claim 16, further comprising the step of determining a line from said bus A to said bus B is out of service due to topology error if said calculated residuals is reduced.

18. The computer-implemented method for power system state estimation of claim 1, wherein said measurements include injection measurements and branch flow measurements.

19. The computer-implemented method for power system state estimation of claim 1, wherein said central processing unit is comprised of a computer.

20. The computer-implemented method for power system state estimation of claim 1, wherein said base set is comprised of measurements which span the same number of system states and may be utilized to solve said power system and wherein said redundant set is comprised of remaining measurements.

* * * * *